(12) United States Patent
Agrawal et al.

(10) Patent No.: US 8,902,755 B2
(45) Date of Patent: *Dec. 2, 2014

(54) DISCOVERING NETWORK TOPOLOGY FROM ROUTING INFORMATION

(75) Inventors: Dakshi Agrawal, Monsey, NY (US); Bong Jun Ko, Harrington, NY (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 197 days.

This patent is subject to a terminal disclaimer.

(21) Appl. No.: 13/569,854

(22) Filed: Aug. 8, 2012

(65) Prior Publication Data

US 2014/0328207 A1 Nov. 6, 2014

Related U.S. Application Data

(63) Continuation of application No. 12/175,931, filed on Jul. 18, 2008, now Pat. No. 8,310,931.

(51) Int. Cl.
*H04L 1/00* (2006.01)

(52) U.S. Cl.
USPC .................. 370/235; 370/252; 709/242

(58) Field of Classification Search
None
See application file for complete search history.

(56) References Cited

U.S. PATENT DOCUMENTS

| | | | |
|---|---|---|---|
| 2001/0038072 A1* | 11/2001 | Aumond et al. | 250/307 |
| 2002/0042274 A1* | 4/2002 | Ades | 455/445 |
| 2005/0129047 A1* | 6/2005 | Ku et al. | 370/428 |
| 2005/0188091 A1* | 8/2005 | Szabo et al. | 709/227 |
| 2007/0297349 A1* | 12/2007 | Arkin | 370/255 |
| 2008/0125161 A1* | 5/2008 | Ergen et al. | 455/524 |
| 2008/0270549 A1* | 10/2008 | Chellapilla et al. | 709/206 |

* cited by examiner

*Primary Examiner* — Jianye Wu
(74) *Attorney, Agent, or Firm* — F. Chau & Associates, LLC

(57) ABSTRACT

A method for inferring network link topology includes receiving an address of a seed node in a network, initializing a set of links and monitors of the network, refining, iteratively beginning at the seed node, the set of links and monitors of the network, wherein a local topology of links is inferred from routing information of a current node and a remote topology of links is inferred from routing information of the set of monitors, wherein the set of monitors is created from the local topology of links, and outputting the topology of links including the local and remote topology of links as a topology of the network.

18 Claims, 3 Drawing Sheets

DISCOVERING NETWORK TOPOLOGY FROM ROUTING INFORMATION

CROSS-REFERENCE TO RELATED APPLICATION

This is continuation application of U.S. application Ser. No. 12/175,931, filed Jul. 18, 2008, the disclosure of which is herein incorporated by reference in its entirety.

STATEMENT REGARDING FEDERALLY SPONSORED RESEARCH OR DEVELOPMENT

This invention was made with Government support under Contract No.: W911NF-06-3-0001 awarded by the U.S. Army. The Government has certain rights in this invention.

BACKGROUND

1. Technical Field

The present invention relates generally to the field of network management and more specifically to discovering a network topology from routing information.

2. Discussion of Related Art

In Network Management Systems (NMS) and applications, accurate knowledge of network topology (connectivity) is needed for various network management tasks. For example, the information about network topology enables a NMS to correlate pieces of end-to-end diagnostics and monitoring information to identify failed components and performance bottlenecks. Furthermore, higher-level network management functions, such as root-cause-analysis (RCA), service-level-agreements (SLA) monitoring, and network failure impact analysis, can be done via the analysis performed on top of the monitored topology.

The technologies in network management for topology monitoring typically rely on the ability of the NMS to query every node in the network to discover network links and determine current states of the network links. For example, a network management system would discover the topology of the network by a BFS (Breadth First Search) process, i.e., iterating the process of querying a node's adjacency table that lists its neighbors and visiting its neighbors until no more new nodes (or links) can be discovered. A disadvantage of this approach is its scalability: the complexity of the topology monitoring mechanism grows linearly as the network size grows.

Therefore, a need exists for a system and method of discovering a network topology scalably from network monitoring information of a subset of nodes in the network.

BRIEF SUMMARY

According to an embodiment of the present disclosure, a method for inferring network link topology includes receiving an address of a seed node in a network, initializing a set of links and monitors of the network, refining, iteratively beginning at the seed node, the set of links and monitors of the network, wherein a local topology of links is inferred from routing information of a current node and a remote topology of links is inferred from routing information of the set of monitors, wherein the set of monitors is created from the local topology of links, and outputting the topology of links including the local and remote topology of links as a topology of the network.

According to an embodiment of the present disclosure, a computer readable medium is provided embodying instructions executable by a processor to perform a method for inferring network link topology. The method includes receiving an address of a seed node in a network, initializing a set of links and monitors of the network, refining, iteratively beginning at the seed node, the set of links and monitors of the network, wherein a local topology of links is inferred from routing information of a current node and a remote topology of links is inferred from routing information of the set of monitors, wherein the set of monitors is created from the local topology of links, and outputting the topology of links including the local and remote topology of links as a topology of the network.

According to an embodiment of the present disclosure, a computer implemented method for topology inference from routing information of a network includes receiving an address of a seed node in a network, initializing a set of links and monitors of the network, refining, iteratively, the topology of the network, wherein topology links are inferred from routing information of a seed node and at least one monitor node, wherein the topology links autonomously propagated throughout the network to observe additional topology links by monitoring and correlating topology link updates to the routing information, and outputting the topology of links including the local and remote topology of links as a topology of the network.

According to an embodiment of the present disclosure, a computer implemented method for topology inference from a distance matrix of a network includes receiving information about a seed node in the network, initializing an empty set of monitors in the network and a topology of the network, inferring local topology information including at least one local link from the seed node, updating the topology with the local topology information, inferring remote topology information, including at least one remote link of at least one monitor at an end of the at least one local link, updating the topology to include remote topology information, and outputting the topology of the network updated to include the local and remote topology information.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

Figure 1:
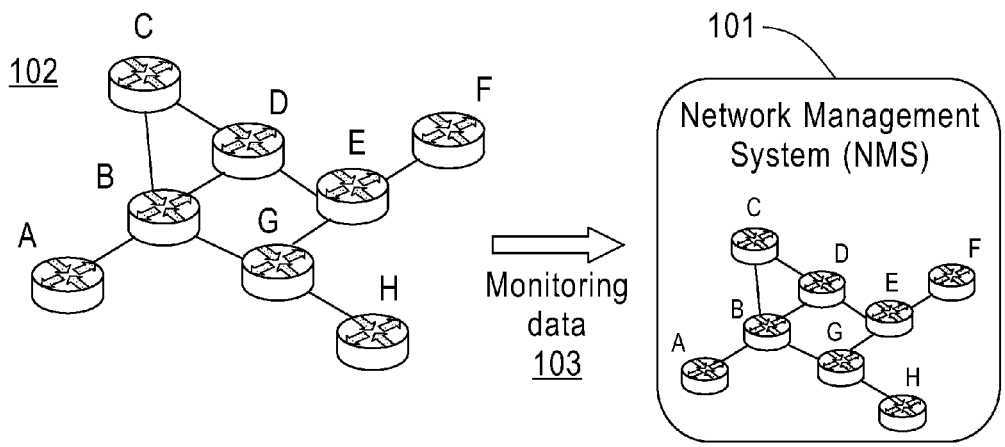
FIG. 1 is an illustration of a network management system according to an embodiment of the present disclosure.

According to an embodiment of the present disclosure, a NMS (Network Management System) discovers 101 a network topology 102 using routing information 103 available on nodes (topology monitors) in the network. The topology monitors are a subset of all the nodes in the network. Exemplary methods are described for discovery and identification of the network topology given one or more randomly selected seed node(s) in the network. By reducing a number of nodes that need to be inspected to discover the network topology, costs associated with topology discovery can be reduced while speed of discovery is increased.

The network topology is discovered from the routing information available at the network nodes. The routing information is an information element that the respective node refers to when a path to a packets destination is determined. An exemplary form of routing information is a routing table including a 3-tuple having a destination, a next-hop node, and a distance to the destination, where the entire path to the destination is determined by the hop-by-hop decision of a series of nodes towards the destination. The destination and next-hop node may be expressed in terms of a network address, e.g., an Internet Protocol (IP) address. The distance may be expressed in terms of a number of hops needed to reach the destination, as a sum of weights of links between nodes as described herein, etc. The routing information can be available in different forms depending on the networking technologies, e.g., route update messages in distance-vector protocols, route announcements in path-vector protocols, route caches in some ad-hoc routing protocols, forwarding tables in MPLS (Multi-Protocol Label Switching) LSR's (Label Switched Routers), etc. Embodiments of the present disclosure are applicable to these technologies regardless of how routing information is stored in a node or how it is obtained from a node.

Using the routing information and the distance information as a means to discover the network topology enables topology discovery in the NMS 101 which is scalable. Routing, in one of its several realizations, may be implemented across networking technologies, regardless of a specific mechanism to determine the network paths, which makes a routing information-based network monitoring mechanism applicable to a cross-technology solution. The routing information (e.g., routing tables) is available for the NMS 101 to query via known network management protocols such as SNMP (Simple Network Management Protocol). Exemplary methods may use the ability of routing mechanisms that autonomously detect the existence of local links and propagate the information throughout the network using distribution protocols, e.g., the Label Distribution Protocol (LDP). Thus, remote links may be observed by monitoring and correlating local updates to routing information 103, thereby facilitating scalable topology discovery for a network 102.

For a topology monitoring task, the NMS 101 sees the network 102 as an undirected weighted graph G=(V,E) representing a set of routing nodes, where vertex V is the set of nodes and E is the set of edges connecting the nodes in V, where edges represent links connecting routing nodes. Edges are annotated with a weight. The weight of an edge (i, j) in E may be denoted by $w(i, j)$ (>0). The shortest path distance between two nodes i and j may be denoted by $d(i, j)$. The shortest path distance between the two nodes i and j may be measured as the sum of the weights of all links in the shortest route from i to j. It may be assumed that $w(i, j)$ is symmetric, where $w(i, j)=w(j, i)$; consequently, $d(i, j)$ is symmetric.

A minimal realization of routing information is assumed, wherein the routing information at a node i in V is a collection of entries (e.g., in a routing table) where each entry includes a tuple $(k, nh(i, k), d(i, k))$ for every destination node k in the network, where a next-hop $nh(i, k)$ is the neighbor node of i (i.e., link $(i, nh(i, k))$ is in E) that i sends the packets destined for k, and distance $d(i, k)$ is the distance between i and k.

Figure 2:
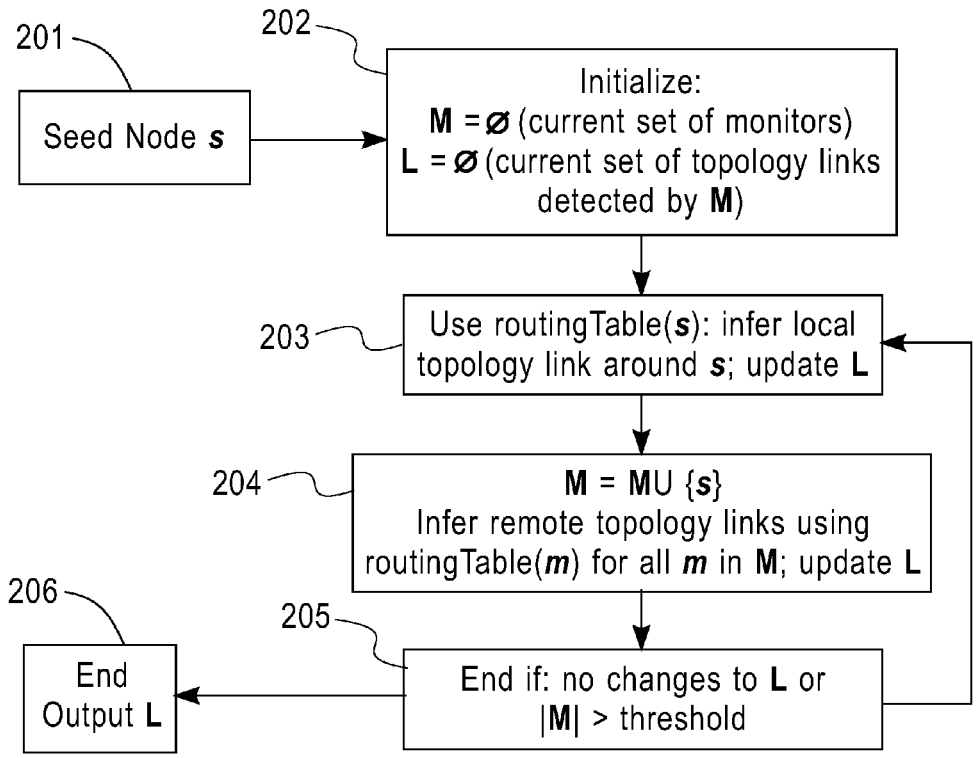
FIG. 2 is a flow chart of a method for discovering network according to an embodiment of the present disclosure.

Referring to FIG. 2, in block 201 seed nodes s are given, and in block 202 monitors (M) and topology links (L) to be detected by the monitors are initialized; the initialization is an empty set of monitors and links (M=Ø and L=Ø). A local network topology is iteratively refined starting at the seed nodes s, wherein local and remote topology is inferred from a given set of monitors. In block 203 routing information is used to infer local topology, e.g., links, around s and L is updated. In block 204 a set of topology monitors is iteratively added (M=M∪{s}); the routing information of the added topology monitors can be used to discover the remote topology of the network; remote topology links are inferred from routing information of the monitors m in M (see for example, FIGS. 3 and 4). The addition of topology monitors is discussed herein with reference to FIG. 5. Iterations continue until an end condition is satisfied in block 205. In block 206 a topology of links L is output. Referring again to block 205, the end condition may be determined, for example, where no change in the topology L is made by a prior iteration, or where a change in the set of monitors is greater than a threshold value (|M|>threshold).

Referring more particularly to inferring local topology from a given set of monitors in block 203; given a set of one or more topology monitors $m_1, m_2, \ldots, m_r$, the next hop in a monitor's routing information can be used to construct the local topology around the node m. If $nh(m, i)=j$, then there exists a link $(m, j)$ such that $w(m, j)=d(m, j)$. Also, let $k=\text{argmin}_{\{k'\}} \{d(m, k')-d(m, j)\}$ where $nh(m, k')=j$, then there exists a link $(j, k)$ such that $w(j, k)=d(m, k)-d(m, j)$. Additionally, if the network uses a hop count based distance metric, then for every k such that $d(m, k)=2$ and $nh(m, k)=j$, there exists a link $(j, k)$ such that $w(j, k)=1$.

Figure 3:
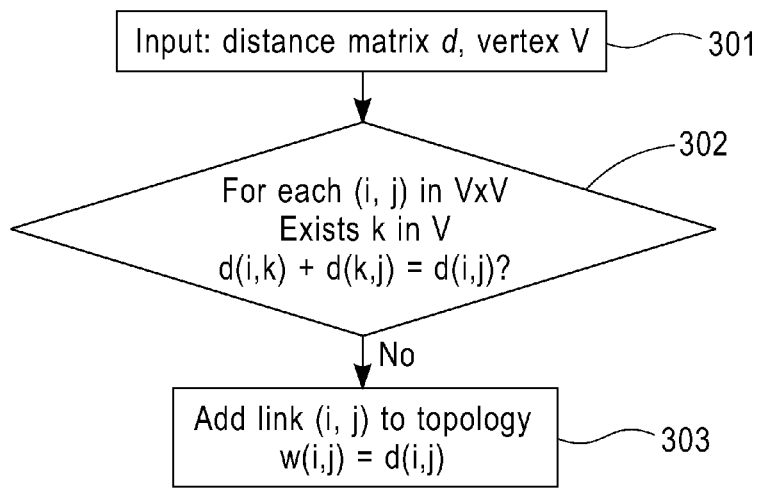
FIG. 3 is a flow chart of a method for inferring topology using full distance matrix according to an embodiment of the present disclosure.
Figure 4:
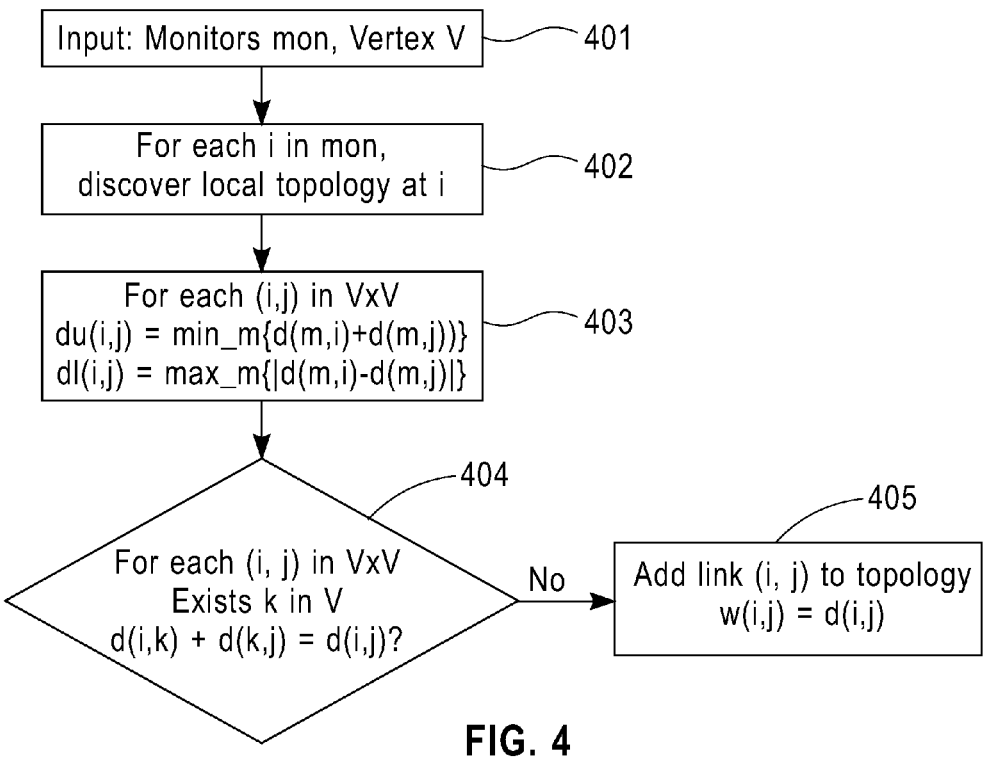
FIG. 4 is a flow chart of a method for inferring topology using partial distance matrix according to an embodiment of the present disclosure.

FIGS. 3 and 4 are exemplary methods for inferring topology links from a distance matrix and a partial distance matrix, respectively.

Referring to FIG. 3, in block 301 as an exemplary alternative to the partial distance matrix above; given a complete distance matrix $d(i, j)$ for all i and j of vertex V, network links may be inferred as follows: in block 302 a link $(i, j)$ exists if and only if there exists no node k such that $d(i, k)+d(k, j)=d(i, j)$; Also, in block 303 the weight w of the network link $(i, j)$ is $w(i, j)=d(i, j)$.

Referring to FIG. 4, in block 401 given a partial distance matrix $d(m, i)$ having one or more monitors m in vertex X, a local topology is determined for each i of the one or more monitors m 402. In block 403, lower bounds (dl) and upper bounds (du) on $d(i, j)$ are determined for all i and j as follows: $\text{Max}_{\{m\}} |d(m, i)-d(m, j)| \leq d(i,j) \leq \text{Min}_{\{m\}} d(m, i)+d(m, j)$ 403. At block 405, using a partial distance matrix, the existence of a link $(i, j)$ is inferred if there exists no node k in vertex V such that $du(i, k)+du(k, j) \leq dl(i, j)$, where $du(k, j)$ denotes an upper bound on $d(k, j)$ and $dl(k, j)$ denotes a lower bound on $d(k, j)$ (see block 404).

Figure 5:
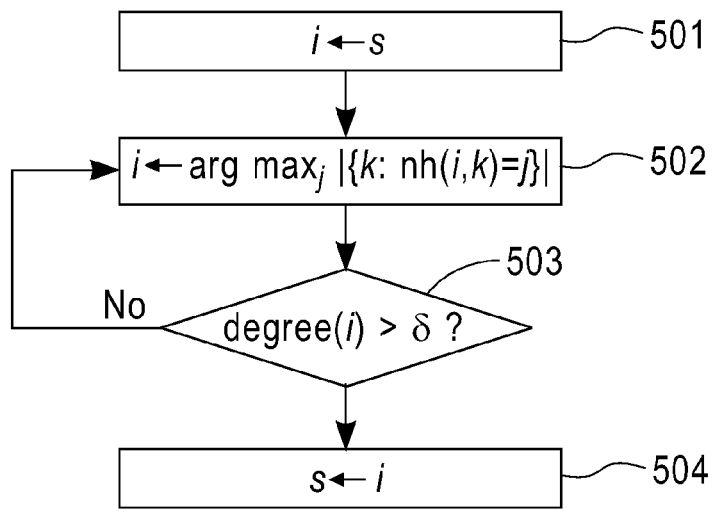
FIG. 5 is a flow chart of a method for discovering topology monitors according to an embodiment of the present disclosure.

FIG. 5 depicts the construction of the set of topology monitors whose routing information can be used to discover the network's topology given a set of one or more seed nodes in the network (FIG. 2, block 204). The set of topology monitors can be constructed using a guided random walk algorithm. The guided random walk algorithm discovers high degree nodes and adds the high degree modes to the set of topology monitors. In block 501 the random walker starts at a seed node s and discovers high degree nodes as follows: in block 502 when the random walker is at node s, it chooses a next node i, wherein i has a maximum number of routes emanating from it as among a set of neighbors of s, that is, node $i=\text{argmax}_{\{j\}} |\{k:nh(i,k)=j\}|$; ties may be broken arbitrarily. In block 503, all nodes whose degree (number of neighbors) is greater than a threshold (degree(i)>δ) are added to the set of topology monitors in block 504. One of ordinary skill in the art would appreciate that various thresholds may be selected. As described herein, the threshold is greater than 0.

It is to be understood that embodiments of the present disclosure may be implemented in various forms of hardware, software, firmware, special purpose processors, or a combination thereof. In one embodiment, a software application program is tangibly embodied on a program storage device. The application program may be uploaded to, and executed by, a machine comprising any suitable architecture.

Figure 6:
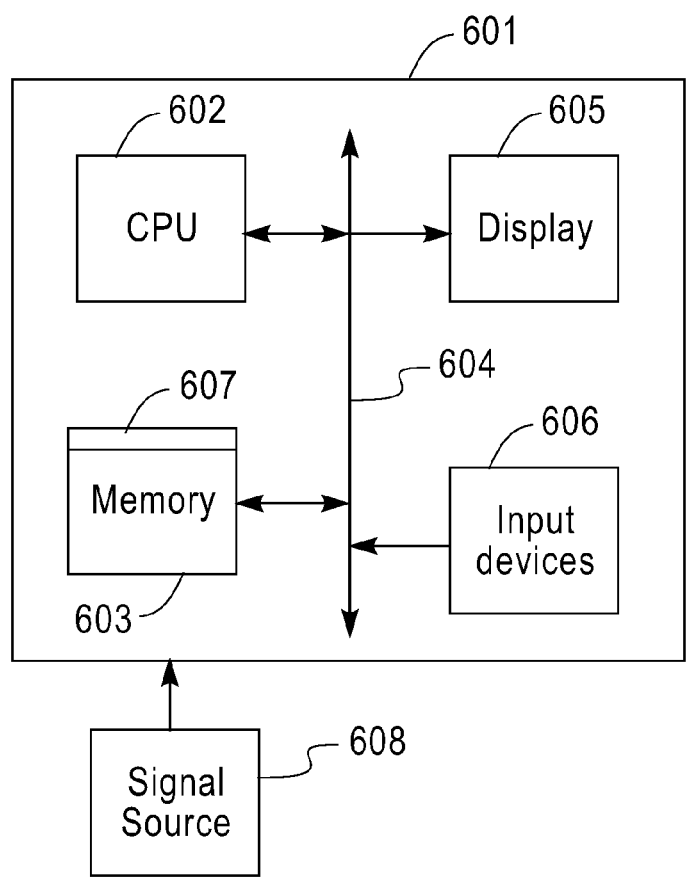
FIG. 6 is a diagram of a computer system for discovering a network topology from routing information according to an embodiment of the present disclosure.

Referring now to FIG. 6, according to an embodiment of the present disclosure, a computer system 601 for discovering a network topology from routing information can comprise, inter alia, a central processing unit (CPU) 602, a memory 603 and an input/output (I/O) interface 604. The computer system 601 is generally coupled through the I/O interface 604 to a display 605 and various input devices 606 such as a mouse and keyboard. The support circuits can include circuits such as cache, power supplies, clock circuits, and a communications bus. The memory 603 can include random access memory (RAM), read only memory (ROM), disk drive, tape drive, etc., or a combination thereof. The present invention can be implemented as a routine 107 that is stored in memory 603 and executed by the CPU 602 to process the signal from the signal source 608. Thus, the memory is a computer readable medium embodying instructions executable by a processor to perform a method for inferring network link topology. As such, the computer system 601 is a general purpose computer system that becomes a specific purpose computer system when executing the routine 607 of the present disclosure.

The computer platform 601 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the system is programmed. Given the teachings of the present disclosure provided herein, one of ordinary skill in the related art will be able to contemplate these and similar implementations or configurations of the present disclosure.

Having described embodiments for a system and method of discovering a network topology from routing information, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for inferring network link topology comprising:

receiving an address of a seed node in a network of connected nodes;

initializing a set of links of the network and a set of monitors of the network;

refining, iteratively beginning at the seed node, the set of links and the set of monitors of the network, wherein each iteration comprises inferring a local topology link from routing information and distance information of a current node and a remote topology link from routing information of the set of monitors, wherein a local link (m, j) is inferred between nodes m and j, without querying either node m or j for connectivity information, upon determining that $k=\text{argmin}_{\{k'\}} \{d(m, k')-d(m, j)\}$ where next-hop(m, k')=j, then there exists a link (j, k) such that w(j, k)=d(m, k)−d(m, j), wherein k is a destination node in the network, w is a weight of the link, and d is a distance, and updating the set of links to include the inferred link;

refining the set of monitors based on a refined set of links including the inferred link; and outputting the refined set of links as a topology of the network.

2. The method of claim 1, wherein the refining ends upon determining that an end condition is satisfied.

3. The method of claim 2, wherein the end condition is satisfied upon determining that no change is made to the topology of links by a prior iteration.

4. The method of claim 2, wherein the end condition is satisfied upon determining that a change in the set of monitors is greater than a threshold value.

5. The method of claim 1, wherein the routing information is a full distance matrix.

6. The method of claim 1, further comprising creating the set of monitors in the network by a guided random walk, the guided random walk comprising adding all nodes to the set of monitors having a number of neighbors greater than a threshold.

7. The method of claim 6, wherein the guided random walk begins at the seed node.

8. The method of claim 1, further comprising determining a graph of the topology including distances satisfying a distance matrix.

9. A method for inferring network link topology comprising:

receiving an address of a seed node in a network of connected nodes;

initializing a set of links of the network and a set of monitors of the network;

refining, iteratively beginning at the seed node, the set of links and the set of monitors of the network, wherein each iteration comprises inferring a local topology link from routing information and distance information of a current node and a remote topology link from routing information of the set of monitors, wherein a local link (j, k) is inferred between nodes j and k such that w(j, k)=1 hop, without querying either node j or k for connectivity information, upon determining that d(m, k)=2 hops and a next-hop(m, k)=j, wherein m is a node in the network, w is a weight of the link, and d is a distance, and updating the set of links to include the inferred link;

refining the set of monitors based on a refined set of links including the inferred link; and outputting the refined set of links as a topology of the network.

10. The method of claim 9, wherein the refining ends upon determining that an end condition is satisfied.

11. The method of claim 10, wherein the end condition is satisfied upon determining that no change is made to the topology of links by a prior iteration.

12. The method of claim 10, wherein the end condition is satisfied upon determining that a change in the set of monitors is greater than a threshold value.

13. The method of claim 9, wherein the routing information is a full distance matrix.

14. A method for inferring network link topology comprising:
   receiving an address of a seed node in a network of connected nodes;
   initializing a set of links of the network and a set of monitors of the network;
   refining, iteratively beginning at the seed node, the set of links and the set of monitors of the network, wherein each iteration comprises inferring a local topology link from routing information and distance information of a current node and a remote topology link from routing information of the set of monitors, wherein the routing information includes less than every link in the network, and wherein inferring the local topology link and the remote topology link comprises:
   discovering a local topology of each monitor;
   inferring a link (i, j) upon determining there exists no node k in the network such that $du(i, k)+du(k, j) \leq dl(i, j)$, wherein dl is a lower bound and du is an upper bound on a distance d(i, j) for all nodes i and j; and
   adding the link (i, j) to the set of links upon determining that a weight w of the link (i, j) is $w(i, j)=d(i, j)$, wherein w is a weight of the link, and d is a distance;
   refining the set of monitors based on a refined set of links including the inferred link; and
   outputting the refined set of links as a topology of the network.

15. The method of claim 14, wherein the refining ends upon determining that an end condition is satisfied.

16. The method of claim 15, wherein the end condition is satisfied upon determining that no change is made to the topology of links by a prior iteration.

17. The method of claim 15, wherein the end condition is satisfied upon determining that a change in the set of monitors is greater than a threshold value.

18. The method of claim 14, wherein the distance matrix is a partial distance matrix.

* * * * *